US011999048B2

(12) United States Patent
Schreiber

(10) Patent No.: US 11,999,048 B2
(45) Date of Patent: Jun. 4, 2024

(54) RECEIVING APPARATUS FOR AN ELECTRONIC DEVICE AND ASSEMBLY

(71) Applicant: Hilti Aktiengesellschaft, Schaan (LI)

(72) Inventor: Wolfgang Schreiber, Jengen (DE)

(73) Assignee: Hilti Aktiengesellschaft, Schaan (LI)

( * ) Notice: Subject to any disclaimer, the term of this patent is extended or adjusted under 35 U.S.C. 154(b) by 366 days.

(21) Appl. No.: 17/295,177

(22) PCT Filed: Nov. 26, 2019

(86) PCT No.: PCT/EP2019/082567
§ 371 (c)(1),
(2) Date: May 19, 2021

(87) PCT Pub. No.: WO2020/120124
PCT Pub. Date: Jun. 18, 2020

(65) Prior Publication Data

US 2022/0009080 A1 Jan. 13, 2022

(30) Foreign Application Priority Data

Dec. 12, 2018 (EP) .................................... 18211856

(51) Int. Cl.
*B25H 3/06* (2006.01)

(52) U.S. Cl.
CPC .................................... *B25H 3/06* (2013.01)

(58) Field of Classification Search
CPC ........................................................ B25H 3/06
(Continued)

(56) References Cited

U.S. PATENT DOCUMENTS 3,664,716 A * 5/1972 Johnson ............... A47B 88/487 384/19
4,971,234 A 11/1990 Hay et al.
(Continued)

FOREIGN PATENT DOCUMENTS

CN 101305508 A 11/2008
CN 101925281 A 12/2010
(Continued)

OTHER PUBLICATIONS

International Search Report of PCT/EP2019/082567, dated Jan. 23, 2020.

*Primary Examiner* — Muhammad Ijaz
(74) *Attorney, Agent, or Firm* — Davidson Kappel LLC

(57) ABSTRACT

A receiving apparatus for an electronic device is provided, in particular of a machine tool, including a receiving device for receiving the electronic device and a fastening device for connecting the receiving device to a housing of the machine tool. A displacement device is provided which is connected to a displacement mechanism of the receiving device such that the receiving device is displaceable relative to the displacement device, a blocking device being provided which interacts with the displacement mechanism and is coupled to the displacement device, the displacement device being connectable to the housing of the machine tool by the fastening device, and it being possible to secure the blocking device to the displacement mechanism of the fastening device when the fastening device is connected to the housing of the machine tool, and thus a displacement of the displacement device relative to the displacement mechanism can be prevented. The invention also relates to an assembly consisting of a receiving apparatus and a housing.

20 Claims, 2 Drawing Sheets

(58) Field of Classification Search
USPC .......................... 248/670, 671; 220/529, 534
See application file for complete search history.

(56) References Cited

U.S. PATENT DOCUMENTS

| | | | | |
|---|---|---|---|---|
| 5,056,661 | A | 10/1991 | Balzano et al. | |
| 5,129,613 | A * | 7/1992 | Lloyd | C03B 9/453 248/225.11 |
| 5,884,681 | A * | 3/1999 | Nickles | B25H 1/06 248/676 |
| 6,964,545 | B1 | 11/2005 | Languasco et al. | |
| 2008/0092604 | A1 | 4/2008 | Trinh et al. | |
| 2010/0134986 | A1 | 6/2010 | Hecht et al. | |
| 2010/0314522 | A1 | 12/2010 | Molnar et al. | |
| 2012/0262894 | A1 | 10/2012 | Soefker et al. | |
| 2014/0265789 | A1 | 9/2014 | Metzler et al. | |
| 2015/0034652 | A1 | 2/2015 | Petricek et al. | |
| 2015/0376917 | A1 | 12/2015 | Brunner et al. | |
| 2019/0341223 | A1* | 11/2019 | Berger | G02B 21/34 |
| 2019/0387193 | A1* | 12/2019 | Kang | F16M 13/027 |

FOREIGN PATENT DOCUMENTS

| | | | |
|---|---|---|---|
| CN | 102237639 | A | 11/2011 |
| CN | 102343585 | A | 2/2012 |
| CN | 102668286 | A | 9/2012 |
| CN | 103997934 | A | 8/2014 |
| CN | 104094488 | A | 10/2014 |
| CN | 204277983 | U | 4/2015 |
| CN | 105121763 | A | 12/2015 |
| CN | 205630547 | U | 10/2016 |
| CN | 207240159 | U | 4/2018 |
| CN | 108581991 | A | 9/2018 |
| DE | 102014007828 | A1 | 12/2015 |
| GB | 2548837 | A | 10/2017 |

* cited by examiner

RECEIVING APPARATUS FOR AN ELECTRONIC DEVICE AND ASSEMBLY

The present invention relates to a receiving apparatus for an electronic device, comprising a receiving device for receiving or arranging the electronic device and a fastening device for connecting the receiving device to a housing of the machine tool; the invention also relates to an assembly consisting of a housing of a machine tool and such a receiving apparatus.

BACKGROUND

Receiving apparatuses which have receiving devices for receiving electronic components of machine tools and in which the electronic components are intended to be protected, for example from dust and particles, by the receiving devices, are well known in practice. The receiving devices in which the electronic components are arranged can be secured to fastening bosses of a housing of the machine tool by means of two screws, for example.

The receiving device in question is designed for a specific housing of a machine tool such that, for example, different receiving apparatuses have to be provided for different machine tools.

SUMMARY OF THE INVENTION

It is an object of the present invention to provide a receiving apparatus for an electronic device and an assembly consisting of a housing and such a receiving apparatus, whereby the receiving apparatus has increased flexibility in a structurally simple manner.

The present invention provides a receiving apparatus for an electronic device, in particular of a machine tool, comprising an in particular tub-shaped receiving device for receiving the electronic device and a fastening device for connecting the receiving device to a housing of the machine tool, in that a displacement device is provided which is connected to a displacement mechanism of the receiving device such that the receiving device is displaceable relative to the displacement device, a blocking or positioning device being provided which interacts with the displacement mechanism and is coupled to the displacement device, the displacement device being connectable to the housing of the machine tool by means of the fastening device, and it being possible to secure the blocking device to the displacement mechanism by means of the fastening device when the fastening device is connected to the housing of the machine tool, and thus a displacement of the displacement device relative to the displacement mechanism can be prevented.

A receiving apparatus designed according to the invention is advantageous in that the receiving device is displaceable relative to the displacement device, so that the receiving device can be flexibly arranged depending on the installation space available in each case and can be used in various machine tools depending on the installation space available in each case. In particular, in a step involving the fastening of the receiving device, for example, to a fastening boss of the housing, a position of the receiving device relative to the displacement device can be fixed by the fastening device, for example by clamping the blocking device to the displacement mechanism. As a result, both the fastening of the receiving device to the housing and fixing of a position of the receiving device relative to the displacement device can be comprehensively achieved in a single step in a structurally simple manner.

In a simple embodiment of the receiving apparatus, the displacement mechanism is designed as a rail with a T-shaped cross-section, for example. Alternatively, the displacement mechanism may for example be designed as a slotted link.

The displacement mechanism is in particular rigidly connected to the receiving device and is preferably integral with the receiving device. As a result, the displacement mechanism can be produced in a simple and cost-effective manner.

The displacement device and the blocking device preferably each have a region that surrounds the rail, with both the displacement device and the blocking device preferably each being designed with an upper hook element and a lower hook element, which are each designed to engage the T-shaped limb of the rail from behind. A distance between the upper hook element and the lower hook element in the longitudinal direction of the fastening device is preferably larger in the blocking device than in the displacement device. In a state of the blocking device which allows a displacement of the receiving device relative to the displacement device, in particular an upper hook element of the blocking device is spaced apart from the rail or has play with respect to the rail, such that a displacement of the receiving device relative to the displacement device and the blocking device is made possible in a structurally simple manner.

The displacement device preferably has two regions each interacting with the displacement mechanism in the longitudinal direction of the displacement mechanism, the blocking device being arranged between the regions of the displacement device and interacting with the displacement mechanism in the longitudinal direction of the displacement mechanism. This provides a favorable transmission of force from the blocking device to the displacement device, since, depending on the external force applied, the displacement device can be supported on the blocking device with the one region or the other region in the longitudinal direction of the displacement mechanism.

If the blocking device is displaceable relative to the displacement device perpendicularly to the longitudinal direction of the displacement mechanism in the main extension direction of the fastening device, the blocking device can be displaced in a simple manner between a blocking state and a release state. For this purpose, the blocking device can have at least one, in particular two grooves into which a pin-shaped region or pin-shaped regions of the displacement device engages or engage.

The blocking device is preferably mounted with one region inside a region of the displacement device, with a through-opening for the fastening device being provided in each of these regions of the blocking device and the displacement device. This makes it possible to fix or clamp the blocking device to the rail in a simple manner when the receiving device is secured to the housing, which also causes the displacement device to be displaced relative to the displacement mechanism. The through-openings can be designed as tapered through-holes.

In order to achieve a favorable introduction of force from the fastening device into the blocking device, the blocking device can have a shoulder designed to interact with a head of the fastening device.

In a simple embodiment, the fastening device is designed as a screw or rivet.

In a preferred embodiment, the displacement mechanism is arranged on a side wall of the receiving device and preferably extends substantially over a total length of the side wall of the receiving device in order to achieve a large displacement capability of the receiving device relative to the displacement device.

Secure support of the receiving device on the housing of the machine tool can be achieved if the receiving device has a further displacement mechanism on a side wall which is in particular opposite the side wall, which further displacement mechanism interacts with a further displacement device, a further blocking device and a further fastening device, in particular to the extent described above.

Effective protection of electronic components which can be arranged in the receiving device can be achieved if the receiving device has a planar main body and at least one side wall projecting substantially perpendicularly therefrom. The receiving device is in particular tub-shaped and preferably forms an interior for receiving at least some of the components of the electronics. The in particular one-part or one-piece receiving device has an in particular rectangular cross section, but may also have differently shaped cross sections.

An assembly consisting of a housing of a machine tool and such a receiving apparatus is also proposed, wherein the housing of the machine tool has at least one screw boss or fastening boss to which the receiving device can be secured by means of the fastening device, the blocking device and the displacement device.

An assembly designed according to the invention is advantageous in that the receiving device is displaceable relative to the displacement device, so that the receiving device can be flexibly arranged depending on the installation space available in each case and can be used in various machine tools. In particular, in a step involving the fastening of the receiving device, for example, to a fastening boss of the housing, a position of the receiving device relative to the displacement device can be fixed by the fastening device, for example by clamping the blocking device to the displacement mechanism. As a result, both the fastening of the receiving device to the housing and fixing of a position of the receiving device relative to the displacement device can be comprehensively achieved in a single step in a structurally simple manner.

BRIEF DESCRIPTION OF THE DRAWINGS

Further advantages can be found in the following description of the drawings. An embodiment of the present invention is shown in the drawings. The drawings, the description and the claims contain numerous features in combination. A person skilled in the art will expediently also consider the features individually and combine them to form meaningful further combinations.

In the drawings, identical and equivalent components are provided with the same reference signs. In the drawings.

DETAILED DESCRIPTION

Figure 1:
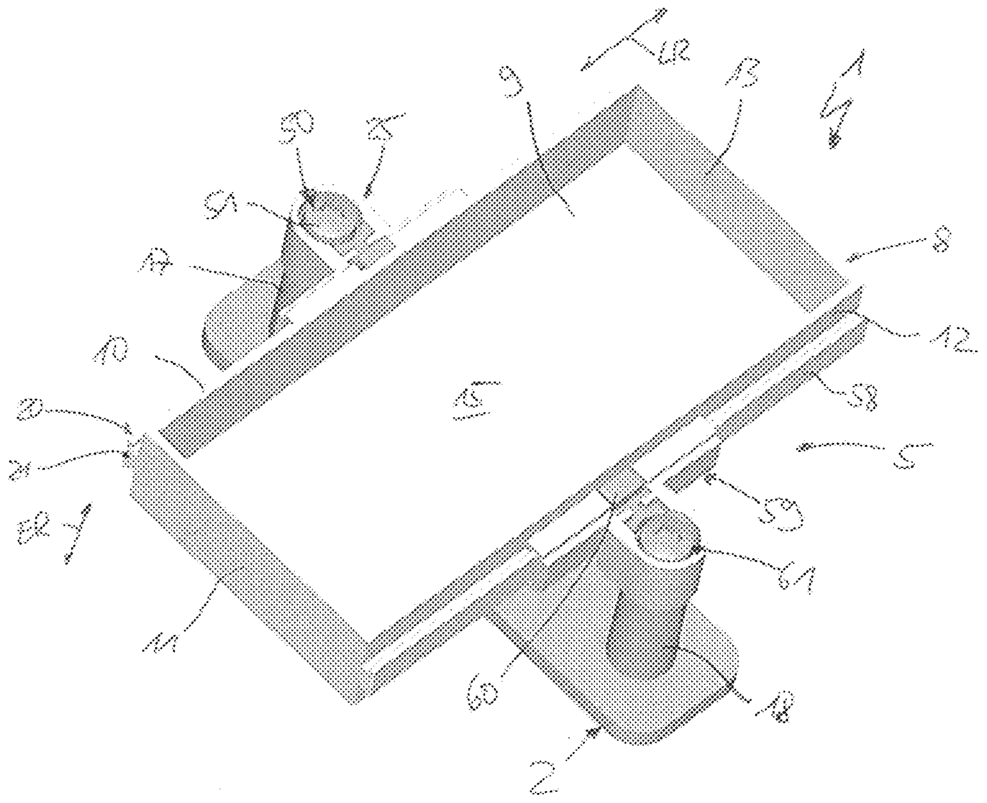
FIG. 1 is a simplified three-dimensional view of an assembly comprising a housing of a machine tool and a receiving apparatus.
Figure 2:
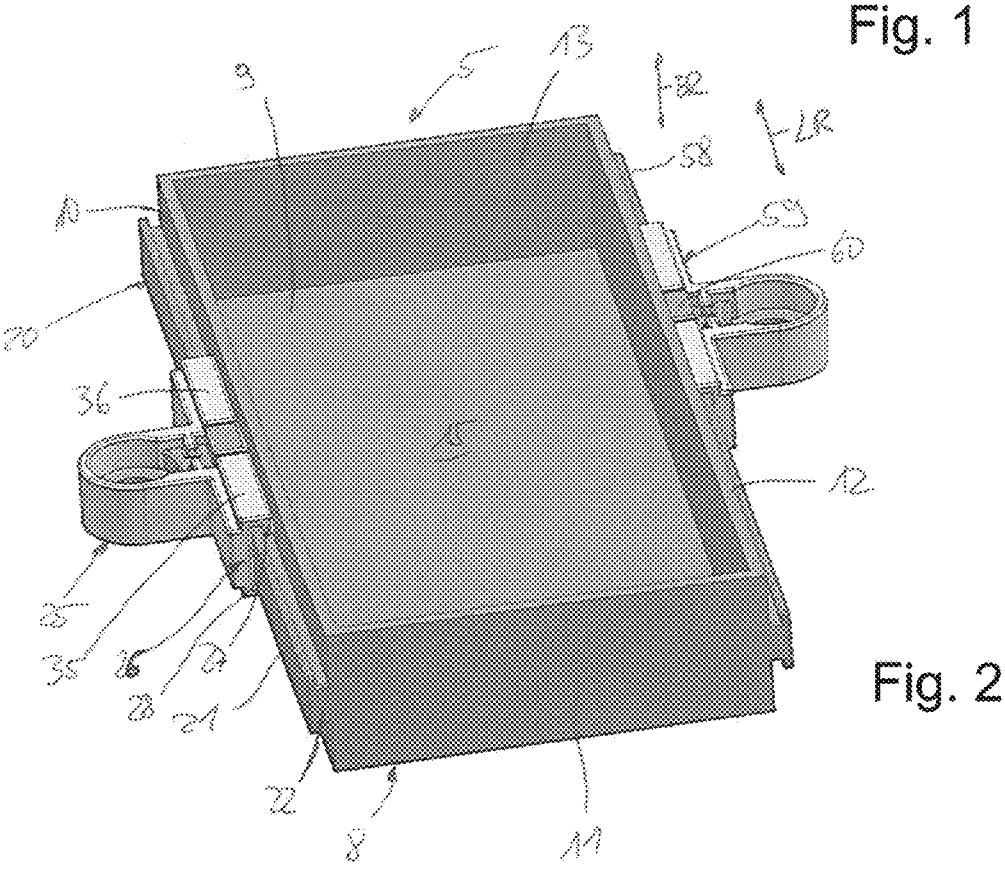
FIG. 2 is a three-dimensional view of the receiving apparatus according to FIG. 1 in isolation.

FIGS. 1 to 4 each show an assembly 1 which has a housing 2 of a machine tool, which is shown only partially and schematically. Electronic components that are sensitive in particular to dust and particles are provided in the housing 2. In order to protect these components, at least in regions, the assembly 1 has a receiving apparatus 5 comprising a receiving device 8 provided for arranging and receiving the electronic components.

The receiving device 8 is in this case formed with a substantially planar and presently rectangular main body 9, with four side walls 10, 11, 12, 13 each adjoining an edge region of the main body 9 perpendicularly to the main body 9, and being integral with the main body 9 here. The receiving device 8 is tub-shaped in this case, with an interior 15 being delimited by the main body 9 and the side walls 10, 11, 12, 13, in which interior the electronic components can be arranged and are at least partially protected from external influences.

In order to be able to arrange the receiving apparatus 5 on the housing 2, the housing 2 in this case has two fastening bosses 17, 18 or screw bosses, which are each designed with an internal thread.

In this case, the receiving device 8 has, on the side wall 10, a displacement mechanism 20 which is designed as a rail and which extends in the present case substantially over the entire longitudinal extent of the side wall 10. The rail 20 has a T-shaped profile with a web 22 projecting from the side wall 10 and a limb 21 arranged substantially in parallel with the side wall 10 and connected to the web 22. The rail 20 is in this case integral with the receiving device 8.

Figure 4:
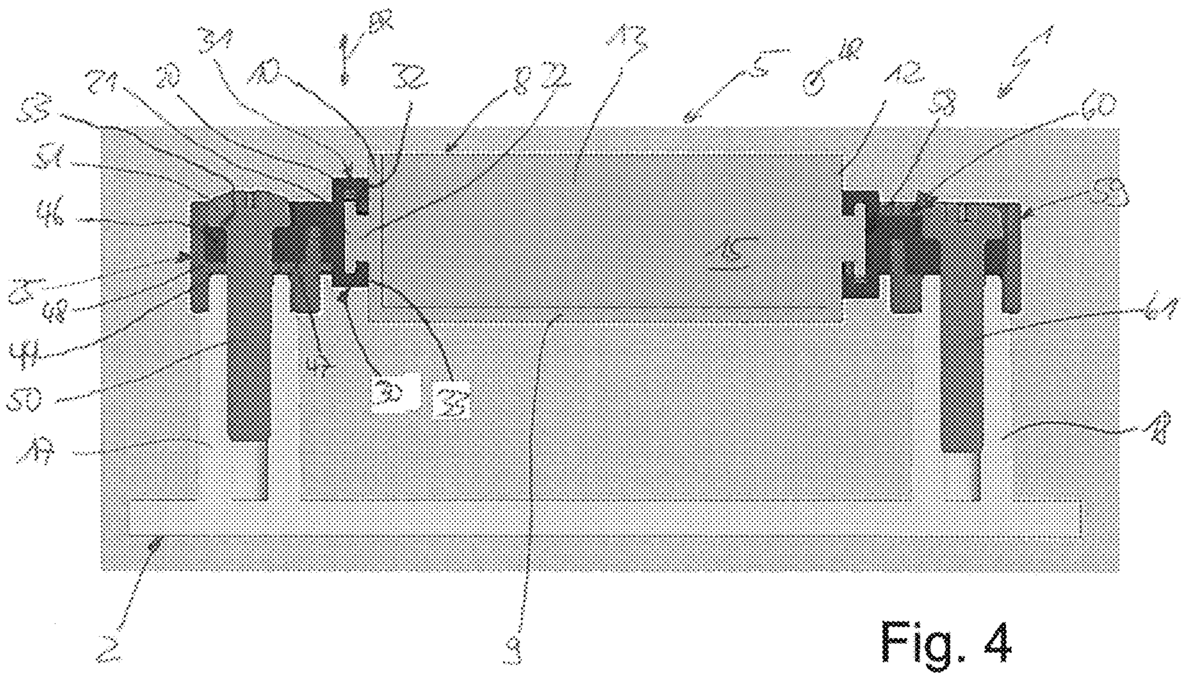
FIG. 4 is a simplified sectional view of the assembly according to line IV-IV in FIG. 3.

A displacement device 25 is slidably mounted on the rail 20, the displacement device 25 having a region 26 that at least partially surrounds the rail 20 in the cross section according to FIG. 4. The region 26 is formed with two hook elements 27, 28, with the upper hook element 27 at least partially surrounding the limb 21 of the rail 20 from above in the view according to FIG. 4 and the lower hook element 28 at least partially surrounding the limb 21 from below in the view according to FIG. 4. The hook elements 27, 28 are arranged relative to one another and relative to the rail 20 in such a way that the hook elements 27, 28 and thus the displacement device 25 are displaceable relative to the rail 20.

In addition to the displacement device 25, a blocking device 30 (see, e.g., FIG. 4) is also slidably mounted on the rail 20 by means of a region 31, the blocking device 30, similar to the displacement device 25, having an upper hook element 32 and a lower hook element 33 which are each designed to interact with the limb 21 of the rail 20. The hook elements 32, 33 of the blocking device 30 are at a greater distance from one another in the extension direction ER (see, e.g., FIGS. 1 and 3) of the limb 21 than the hook elements 27 and 28 of the displacement device 25, such that either the upper hook element 27 or the lower hook element 28 can abut the limb 21 in the extension direction ER of the T-shaped limb 21 and the blocking device 30 can thus be displaced relative to the rail 20, perpendicularly to the longitudinal direction LR of the rail 20 in the extension direction ER of the limb 21.

Figure 3:
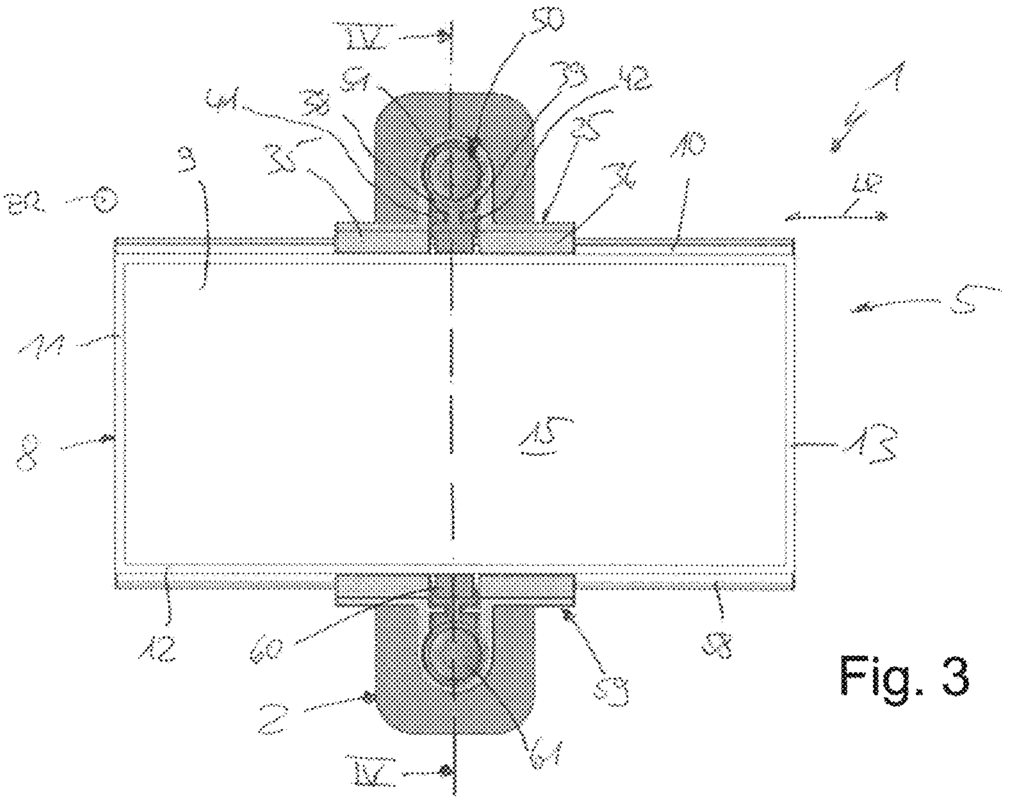
FIG. 3 is a simplified plan view of the assembly according to FIG. 1.

The displacement device 25 has two regions 35, 36 each interacting with the rail 20 in the longitudinal direction LR of the rail 20, the region 31 of the blocking device 30 interacting with the rail 20 being arranged between the first region 35 and the second region 36 of the displacement device 25 in the longitudinal direction LR of the rail 20, as can be seen in more detail in FIG. 3 in particular.

In order to improve guidance of the blocking device 30 relative to the displacement device 25 in the extension direction ER of the T-shaped limb 21, the blocking device 30 in this case has two grooves 38, 39, which can be seen in more detail in FIG. 3, for example, which extend in the extension direction ER of the limb 21 and in each of which a pin-shaped region 41 and 42 of the displacement device 25 is guided.

The displacement device 25 also has a coupling region 44 which is designed to interact with the fastening boss 17 of the housing 2. Likewise, the blocking device 30 has a substantially cylindrical coupling region 46 by means of which the blocking device 30 is arranged in a substantially hollow-cylindrical connection region 48 of the displacement device 25. Mutually facing wall regions of the coupling region 46 of the blocking device 30 and the coupling region 44 of the displacement device 25 can taper downwards in the view according to FIG. 4. Both the coupling region 46 of the blocking device 30 and the coupling region 44 and the connection region 48 of the displacement device 25 each have a through-opening or through-hole.

In order to secure the receiving apparatus 5 on the housing 2, a fastening device 50 designed here as a screw is provided which, in the view according to FIG. 4, is guided from above through the through-holes in the blocking device 30 and the displacement device 25 and is in engagement with the internal thread of the fastening boss 17. A head 51 of the screw 50 abuts a shoulder of the blocking device 30.

As can be seen in more detail in FIG. 4, the receiving device 8, on the side wall 12 which is opposite the side wall 10, has a further displacement mechanism 58 which is designed as a rail and which interacts with the fastening boss 18 by means of a further displacement device 59, a further blocking device 60 and a further fastening device 61. With regard to the functioning and interaction of these elements, reference is made to the above statements regarding the corresponding elements on the other side of the receiving device 8.

The blocking device 30 is in a position in which the displacement device 25 is displaceable relative to the receiving device 8 in the longitudinal direction LR. The lower hook element 33 substantially abuts the T-shaped limb 21 of the rail 20, and a surface of the coupling region 46 of the blocking device 30 which is a lower surface in the extension direction ER is spaced apart from the fastening boss 17. The screw 50 is not yet fully screwed to the fastening boss 17.

In contrast, the screw 61 is completely screwed into the fastening boss 18. The upper hook element 32 of the blocking device 60 is in this case in contact with the limb 21 of the rail 20 and clamped thereto, such that displacement of the displacement device 59 relative to the rail 20 and thus the receiving device 8 is prevented. The blocking device 60 in this case abuts the fastening boss 18 with the lower surface of the coupling region similar to the lower surface 47 of the coupling region 46 of blocking device 30.

When the receiving apparatus 5 is connected to the housing 2 of the machine tool, the screws 50, 61, for example, can first be brought into engagement with the relevant fastening boss 17 or 18, with the lower hook element 33 of the blocking devices 30 and 61 being in contact with the relevant rail 20 or 58. In this state, a position of the receiving device 8 relative to the displacement device 25 or 59 and thus relative to the fastening bosses 17, 18 can be adjusted to the desired extent. Then, by further tightening the screws 50, 61, the blocking devices 30 and 60 can be wedged or clamped against the rails 20 and 58, respectively, such that reliable securing of the receiving device 8 to the fastening bosses 17, 18 is achieved.

LIST OF REFERENCE SIGNS

1 assembly
2 housing
5 receiving apparatus
8 receiving device
9 main body
10 side wall
11 side wall
12 side wall
13 side wall
15 interior
17 fastening boss
18 fastening boss
20 displacement mechanism; rail
21 limb of the rail
22 web of the rail
25 displacement device
26 region of the displacement device
27 upper hook element of the displacement device
28 lower hook element of the displacement device
30 blocking device
31 region of the blocking device
32 upper hook element of the blocking device
33 lower hook element of the blocking device
35 first region of the displacement device
36 second region of the displacement device
38 groove of the blocking device
39 groove of the blocking device
41 pin-shaped region of the displacement device
42 pin-shaped region of the displacement device
44 coupling region of the displacement device
46 coupling region of the blocking device
47 surface
48 connection region of the displacement device
50 fastening device; screw
51 head of the screw
53 shoulder of the blocking device
58 further displacement mechanism; rail
59 further displacement device
60 further blocking device
61 further fastening device; screw
ER extension direction of the limb
LR longitudinal direction of the rail

What is claimed is:

1. A receiving apparatus for an electronic device, the receiving apparatus comprising:

a receiving device for receiving the electronic device;

a fastening device for connecting the receiving device to a housing of a machine tool;

a displacement device connected to a displacement mechanism of the receiving device such that the receiving device is displaceable relative to the displacement device; and a blocking device interacting with the displacement mechanism and coupled to the displacement device, the displacement device being connectable to the housing of the machine tool via the fastening device, the blocking device being securable to the displacement mechanism via the fastening device when the fastening device is connected to the housing of the machine tool to prevent a displacement of the displacement device relative to the displacement mechanism.

2. The receiving apparatus as recited in claim 1 wherein the displacement mechanism is designed as a rail.

3. The receiving apparatus as recited in claim 1 wherein the displacement mechanism is rigidly connected to the receiving device.

4. The receiving apparatus as recited in claim 2 wherein the displacement device and the blocking device each have a region surrounding the rail.

5. The receiving apparatus as recited in claim 1 wherein the displacement device has two regions each interacting with the displacement mechanism in a longitudinal direction of the displacement mechanism, the blocking device being arranged between the two regions of the displacement device and interacting with the displacement mechanism in the longitudinal direction of the displacement mechanism.

6. The receiving apparatus as recited in claim 1 wherein the blocking device is displaceable relative to the displacement device, perpendicularly to a longitudinal direction of the displacement mechanism in a main extension direction of the fastening device.

7. The receiving apparatus as recited in claim 6 wherein the blocking device is mounted with a first region inside a second region of the displacement device, with a through-opening for the fastening device being provided in each of the first and second regions.

8. The receiving apparatus as recited in claim 1 wherein the blocking device has a shoulder designed to interact with a head of the fastening device.

9. The receiving apparatus as recited in claim 1 wherein the fastening device is designed as a screw or rivet.

10. The receiving apparatus as recited in claim 1 wherein the displacement mechanism is arranged on a side wall of the receiving device.

11. The receiving apparatus as recited in claim 10 wherein the receiving device has a further displacement mechanism interacting with a further displacement device, a further blocking device and a further fastening device.

12. The receiving apparatus as recited in claim 11 wherein the further displacement mechanism is arranged on a further side wall opposite the side wall.

13. The receiving apparatus as recited in claim 1 wherein the receiving device has a planar main body and at least one side wall projecting substantially perpendicularly therefrom.

14. An assembly comprising: a housing of a machine tool and the receiving apparatus as recited in claim 1, wherein the housing of the machine tool has at least one screw boss, the receiving device securable to the at least one screw boss via the fastening device, the blocking device and the displacement device.

15. A machine tool comprising: a housing, and the receiving apparatus as recited in claim 1.

16. The machine tool as recited in claim 15 wherein the housing has two fastening bosses, the receiving apparatus being arranged on the housing via the two fastening bosses.

17. The machine tool as recited in claim 16 wherein the two fastening bosses are screw bosses with internal threads.

18. The machine tool as recited in claim 17 wherein the fastening device includes screws engaging with the internal threads.

19. The machine tool as recited in claim 18 wherein the screws pass through through-holes in the blocking device and the displacement device.

20. The receiving apparatus as recited in claim 1 wherein the fastening device passes through through-holes in the blocking device and the displacement device.

* * * * *